United States Patent [19]

Schulze

[11] Patent Number: 4,796,062

[45] Date of Patent: Jan. 3, 1989

[54] METHOD FOR CALIBRATING EXPOSURE OF MULTIPLE CAMERAS

[76] Inventor: Michael D. Schulze, 23216 Marter, St. Clair Shores, Mich. 48080

[21] Appl. No.: 49,136

[22] Filed: May 12, 1987

[51] Int. Cl.$^4$ ............................................. G03B 27/74
[52] U.S. Cl. ........................................ 355/77; 355/38
[58] Field of Search ............... 355/77, 38, 40; 354/79, 354/477; 356/213, 220, 224, 225, 226, 444, 404

[56] References Cited

U.S. PATENT DOCUMENTS

| | | | |
|---|---|---|---|
| 3,985,950 | 9/1976 | Barbieri et al. | 355/38 |
| 3,999,195 | 12/1976 | Little | 354/79 |
| 4,061,428 | 12/1977 | Amano et al. | 356/404 |
| 4,118,719 | 9/1978 | Leiter et al. | 354/79 |
| 4,194,838 | 3/1980 | Bey et al. | 356/226 X |
| 4,297,017 | 9/1981 | Farmer | 354/79 |
| 4,371,254 | 2/1983 | Howitt | 355/38 |
| 4,417,811 | 11/1983 | Hamer | 355/40 X |
| 4,563,083 | 1/1986 | Shiota | 355/38 X |

OTHER PUBLICATIONS

Minolat Meter Catalog MLC 412E-F6.

Primary Examiner—L. T. Hix
Assistant Examiner—D. Rutledge
Attorney, Agent, or Firm—Peter D. Keefe

[57] ABSTRACT

A light level meter composed of a fiber optic cable having a light receptor end coupled to a conventional light meter is used for measuring illumination levels in spatially limited locations. By the method of the invention, a reference camera is calibrated for proper exposure settings using a series of test exposures. A light level reading is then taken using the fiber optic cable coupled light level at a location preferably near the camera lens. Identical secondary cameras are adjusted to have the same exposure settings as the reference camera, and the illumination for the secondary cameras is adjusted to match that of the reference camera by matching the secondary light level with the reference light level using the fiber optic cable coupled light level meter positioned at the same relative location at the secondary cameras as used for the reference camera.

13 Claims, 1 Drawing Sheet

METHOD FOR CALIBRATING EXPOSURE OF MULTIPLE CAMERAS

BACKGROUND OF THE INVENTION

The present invention relates to calibrating the exposure of cameras, more particularly to a method for setting the exposure parameters for secondary camera installations after a first camera has been satisfactorily calibrated, using a light level meter.

Photographic cameras must be adjusted to regulate the light entering into the chamber housing the unexposed photographic film in order that proper exposure is achieved. It is very well known in the art that a number of parameters must be adjusted, in combination, so that the desired exposure occurs: the illuminating light level may be varied up or down; the f-stop in the camera lens may be varied to allow for a larger or smaller light entry aperture; the shutter speed may be increased or decreased; and finally, a film having a higher or lower exposure speed, or ASA rating, may be utilized.

In order to be able to set the above enumerated exposure control parameters, a light level meter is commonly used which gives a reading of the intensity of the illuminating light. With this information, and a foreknowledge of the desired photographic effect that is desired, the exposure parameters may each be set with confidence that the photographic film will be properly exposed.

Various devices have been used in the prior art to sample illuminating light. Most typically, these include a light level meter having a photo-sensitive surface which converts light energy into electrical energy. The electrical energy in turn is used by an electrical circuit in the meter to register the light level in either analog or digital form.

The problem encountered by these light level meters is that they are somewhat bulky, preventing them to be used in places having very limited room, such as a camera used for taking photographs of items in an entirely self contained space. An example of this is a photographic camera used to photograph documents onto microfilm.

There is, consequently, a need to be able to selectively sample light in hard to reach locations due to limited spatial accessibility. U.S. Pat. No. 4,194,838 to Bey, et al, discloses the use of a light probe coupled to a light guide, which in turn is connected to a photodetector circuit; this patent teaches this structure for use in a digital color densitometer used to set the exposure of photographic paper, where the scene illuminated is an exposed photographic negative. U.S. Pat. No. 4,061,428 to Amano, et al, discloses a scanning color densitometer for obtaining information on the areal distribution of optical density of a photographic image on a negative using plural input fiber optic bundles. Both of these prior art solutions are directed to setting the exposure of densitometers where the illuminated object is a photographic negative, and neither is directed to solving the need to sample light intensity in hard to reach places. A means for setting the exposure for a standard camera taking a photograph of a scene where the light sampling must be accomplished in a hard to access location remains a problem in the prior art.

What has been discussed thus far relates to the set-up of an individual camera. When a plurality of identical cameras are to be calibrated, the procedure for adjusting each independently can be extremely cumbersome, time-consuming and expensive. Typically, each camera is independently calibrated by taking a light reading, then the camera is adjusted in terms of its f-stop and shutter speed for the particular film being used. In repetitive operations, such as in microfilm camera installations where the f-stop, shutter speed and film type are predetermined, a common calibration procedure is to take a series of film exposures over a range of illumination light level settings to ensure proper exposure of the film. Difficulty enters when the light intensity later varies either because the lamp in the the source of illumination is subject to a changed line voltage, the lamp has been replaced, there is variation in surface texture, coloration, etc. of objects in the scene, or the optics in the light optical path of the camera apparatus have been adjusted or replaced; yet another source of difficulty arises when the film is changed, either in terms of the brand used or the ASA rating. To ensure that the film is properly exposed, a series of test exposures must again be taken. Test exposures result in equipment down-time while the technician awaits developing at a film laboratory, but is necessary so that he can finely adjust the camera as indicated by the best exposed photograph in the series.

What is needed is a method that allows the technician, to set-up each camera, whenever the need arises, such as a new installation, or a change in illumination, film type or camera optics, without the need for test exposures to ensure the accuracy of each camera calibration, based upon the results known for a reference camera.

SUMMARY OF THE INVENTION

The present invention uses a conventional light meter coupled to a fiber optic cable having at least one optical fiber ending in a light receptor for sensing light level at a predetermined location.

The method according to the present invention allows a user to calibrate the exposure parameters of any number of secondary cameras after a first, of like design and operational configuration, has been properly calibrated. The following steps are involved: A first camera, the reference camera, is set-up in the environment contemplated in use by the secondary cameras; the reference camera is then calibrated; a reading of the exposing light level is taken using the fiber optic cable coupled light level meter, preferably at the reference camera lens; the secondary camera is set-up in its environment; the secondary camera is adjusted to have the same shutter and f-stops as the reference camera (if these are variable), and the same film is used in both cameras; a light reading is taken using the fiber optic cable coupled light level meter at the same location relative to the secondary camera as the location that was used for the reference camera; and, the illumination intensity is adjusted, typically by varying the lamp voltage, until the same light level reading is obtained for the secondary camera as was recorded for the reference camera. The secondary camera is now calibrated to expose film in precisely the same manner as the reference camera, thereby obviating need for test exposures of the secondary camera.

It is an ojbect, therefore, of the present invention to provide a light meter which can sense light levels at locations which are difficult or impossible to reach by a conventional light level meter.

It is an additional object of the invention to provide a method for calibrating any number of secondary cameras, after a first, identical camera has been calibrated, without any need for test exposures to be taken with the secondary cameras to ensure proper film exposure.

These, and additional objects, advantages, features, and benefits of the invention shall become apparent from the following specification.

DETAILED DESCRIPTION OF THE PREFERRED EMBODIMENT

Figure 1:
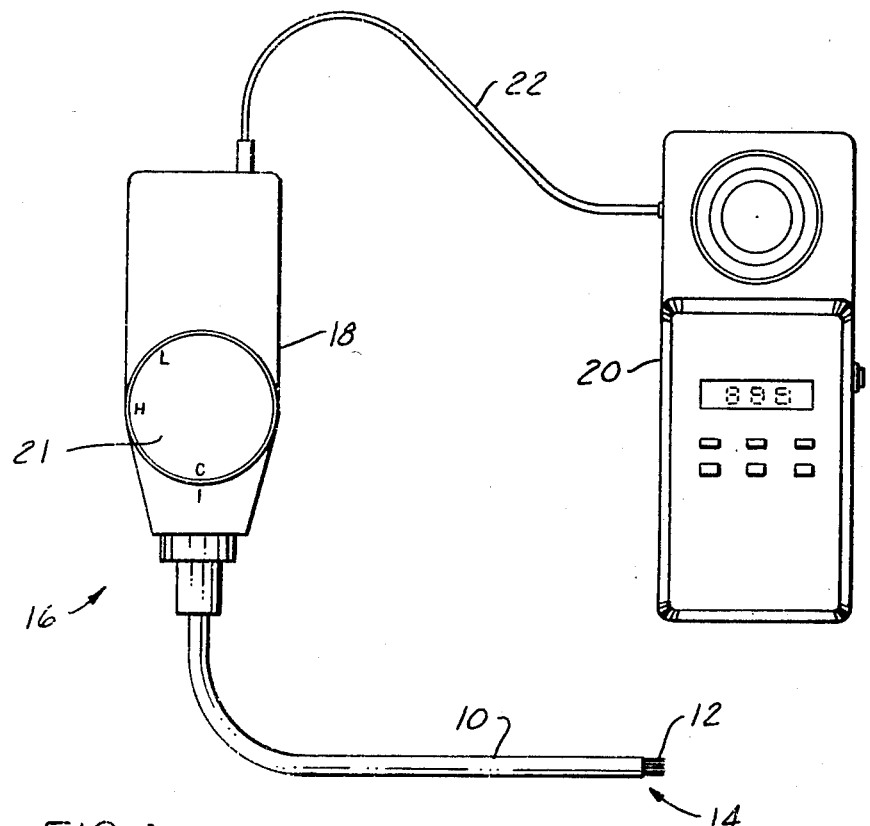
FIG. 1 is a plan view of a fiber optic cable coupled light meter.

Referring now to the figures, FIG. 1 shows a light level meter generally according to the present invention. A fiber optic cable 10 having preferably a plurality of optical fibers 12 has an exposed end 14 which serves as a light receptor for light entry into, and conduction along, the fiber optic cable.

The fiber optic cable 10 is connected to a conventional light meter 16. Because the light coming into the light meter is relatively of low intensity, a booster 18 of the light level entering the meter from the fiber optic cable is preferred. Such a booster, by way of example, may be a Minolta brand "Booster II", where the Minolta brand "Booster II" is then designed to couple with a Minolta brand "Auto Meter III" light level meter 20 by an electrical wire connection 22. Thus, a fiber optic cable 10 picks-up and sends light into the light meter 16, which is composed preferably of a light amplifier or booster 18 and a light level meter 20.

In operation, the scene illumintion is sampled by means of placement of the fiber optic cable light receptor 14 at a location known to the camera user to have particularly useful or important scene illumination information. Such a location may be immediately in front of the camera lens, or may be on the film plane inside the camera. The length of the fiber optic cable 10 coupled with its small diameter permit it to be positioned at locations that would be inaccessible to a conventional, much bulkier light level meter 16.

To use the fiber optic cable coupled light level meter according to the present invention for setting the proper exposure for photography, a calibration of the exposure should first be undertaken because of the varying illumination conditions that may be encountered which may affect light reception at the fiber optic receptor 14. This is easily accomplished by comparing film exposure results for a series of exposures with differing f-stops or shutter speeds and comparing this result to known values for light level readings not using the fiber optic cable, ie., using the light level meter 20 alone. Thereafter, the user should be able to determine the correct film exposure by simply reading the light level registered on the light level meter 16. The Minolta brand "Booster II" has a sensitivity setting 21, which the user can adjust to cause the connected Minolta brand "Auto Meter III" light level meter to display light levels comparable with those registered using the "Auto Meter III" alone.

Figure 2:
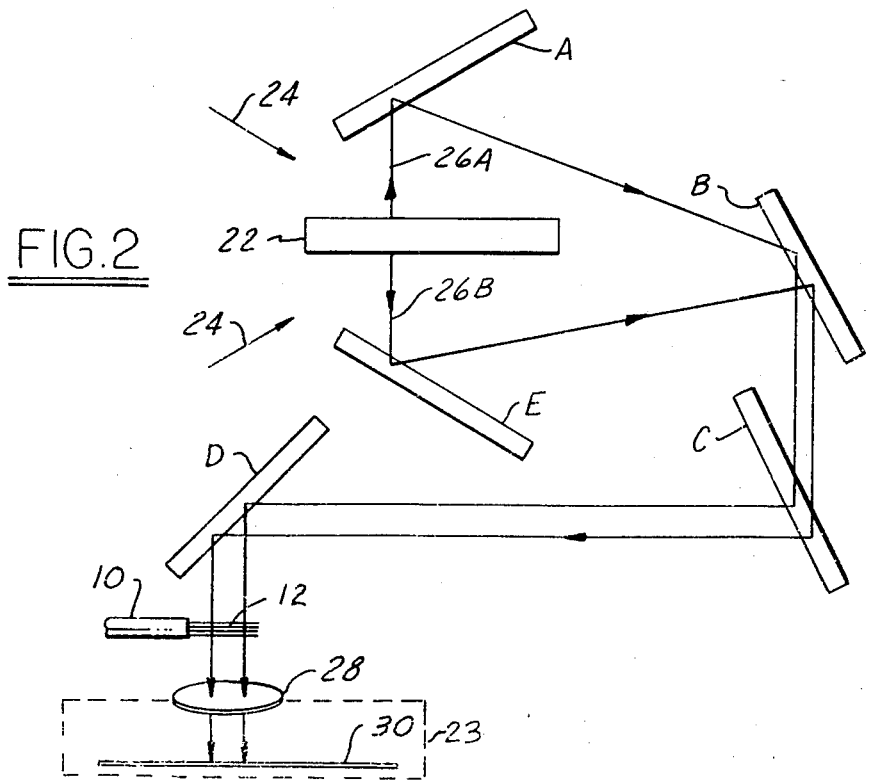
FIG. 2 is a schematic view of a microfilm camera apparatus optical path showing the placement location of the fiber optic cable of FIG. 1 for taking a light level reading.

As an example of use of the present invention, FIG. 2 shows the optical path for a camera 23 used in microfilming canceled checks. A canceled check 22 is illuminated 24 from a light source, not shown. Light reflects off each side of the check, one beam 26A being directed by mirrors A, B, C, and D; the other beam 26B being directed by mirrors E, B, C, and D. Both beams 26A and 26B are directed by mirror D toward the lens 28 of the camera 23, which in turn reaches an unexposed photographic film 30. The fiber optic cable 10 is placed in the optical path so that its light receptor end 14 picks-up light just before entering the camera lens 28. In the tight, confining quarters of such a device as that shown, a conventional light level meter could not be used alone because of its bulk.

According to the method of the present invention, any number of secondary cameras may be calibrated for correct exposure parameters once a first, or reference, camera has been correctly calibrated. The ability to do this hinges on the ability for the user to take an accurate light reading at the reference camera, then adjust the secondary camera source of illumination to have the same light level as that registered for the reference camera, the other exposure parameters being set or preset to be the same as the reference camera, also. In this method of calibrating secondary cameras which are identical with a first camera, there is no need to first calibrate the fiber optic cable coupled light level meter, as only relative values are needed. The following steps are involved:

Calibration of the reference camera: A reference camera is calibrated for correct exposure to a scene to be photographed, using a particular type of film; a scene may be a document, as shown in FIG. 2. This procedure will typically include a series of test exposures over a range of exposure parameter settings, during which the f-stop, shutter speed and illumination may be varied, singly or collectively. Once correct exposure has been achieved, the f-stop, shutter speed and film type are recorded, as are any adjustment particulars of the optical path made during calibration.

Recording the illumination: The fiber optic cable coupled light meter shown in FIG. 1 is used to take a light level reading of the light coming into the camera. This may be at the lens, as shown in FIG. 2, or it may be at the film plane, or it may be some convenient point in the optic path before or after the lens. This value is then recorded, as is the location of the fiber optic cable receptor when making the reading.

Course calibration of the secondary camera: The secondary camera is configured identically with the reference camera and the scene to be photographed is similar; the film used in the secondary camera is identical to the film used in calibrating the reference camera. The f-stop and the shutter speed is set in the secondary camera, if these are not already preset, to be identical with the recorded values determined to be correct for the reference camera.

Fine calibration of the secondary camera: The fiber optic cable coupled light level meter is placed in the secondary camera apparatus so that the light receptor of the fiber optic cable is located at the identical location used when calibrating the reference camera. The illuminating light is now adjusted, by increasing or decreasing the intensity, so that the light level reading at the receptor location is relatively identical with that registered when the reference camera was calibrated.

The secondary camera is now calibrated to expose photographic film in an identical manner as that of the reference camera. Thus, the calibration procedure involving repeated exposure tests need only be conducted on the reference camera apparatus, and the results may be immediately employed when calibrating any number of other identical secondary camera systems without the need of additional exposure tests.

It is understood that this method may be used with a conventional light level meter without the use of a coupled fiber optic cable; however, this can only occur when a particular camera apparatus has sufficient room to accommodate the placement of the light level meter into the optical path, as outlined above.

To those skilled in the art to which this invention appertains, the above described preferred embodiment may be subject to change or modification. Such changes or modifications can be carried out without departing from the scope of the invention, which is intended to be limited only be the scope of the appended claims.

What is claimed is:

1. A method for setting exposure of a first photographic film located in a first camera and thereafter setting exposure of a second photographic film located in at least one secondary camera, comprising the steps of:
   (a) calibrating said first camera so that a first source of illumination will expose said first photographic film a predetermined amount;
   (b) measuring light level of said first source of illumination at a first location relative to said first photographic film;
   (c) calibrating said at least one secondary camera substantially equal to said calibrating of said first camera;
   (d) measuring light level of a second source of illumination at a second location, said second location being a location which is positionally substantially similar in relation to said second photographic film as said first location was in relation to said first photographic film; and
   (e) setting brightness of said second source of illumination so that a light level is measured at said second location that is substantially equal to that measured at said first position.

2. The method of claim 1, wherein said first and secondary cameras are substantially similar and said first photographic film is of a type which is substantially similar to that of said second photographic film.

3. The method of claim 2, wherein said steps (b) and (d) include using a light level meter to measure said light level in each of said steps (b) and (d).

4. The method of claim 3, wherein said light level meter is a fiber optic cable coupled light level meter having a light receptor, and said first location and said second location being positions of location of said light receptor.

5. The method of claim 4, wherein each of said first camera and said at least one secondary camera has an objective lens; and in said steps (b) and (d) said first location is substantially adjacent the objective lens of said first camera and where said second location is substantially adjacent the objective lens of said at least one secondary camera.

6. The method of claim 4, wherein in said steps (b) and (d) said first location is substantially adjacent said first photographic film and said second location is substantially adjacent said second photographic film.

7. The method of claim 3, wherein said step (a) includes at least one of the following steps: setting a shutter speed on said at least one secondary camera, setting an f-stop on said at least one secondary camera and optically adjusting said at least one secondary camera to substantially optically match said first camera.

8. The method of claim 3, wherein said step (c) includes at least one of the following steps: setting a shutter speed on said at least one secondary camera, setting an f-stop on said at least one secondary camera and optically adjusting said at least one secondary camera to substantially optically match said first camera.

9. The method for setting exposure of a first photographic film located in a first camera and thereafter setting exposure of a second photographic film located in at least one secondary camera, where said at least one secondary camera is structurally and functionally substantially identical with said first camera, and where said first photographic film is substantially identical with said second photographic film, comprising the steps of:
   (a) calibrating said first camera so that a first source of illumination will expose said first photographic film a predetermined amount;
   (b) measuring light level of said first source of illumination at a first location relative to said first photographic film using a fiber optic cable coupled light level meter having a light receptor;
   (c) calibrating said at least one secondary camera substantially equal to said calibrating of said first camera;
   (d) measuring light level of a second source of illumination at a second location using said receptor of said fiber optic cable coupled light level meter, said second location being a location which is positionally substantially similar in relation to said second photographic film as said first location was in relation to said first photographic film; and
   (e) setting brightness of said second source of illumination so that a light level is measured by said fiber optic cable coupled light level meter that is substantially equal to that measured at said first position.

10. The method of claim 9, wherein said step (a) includes at least one of the following steps: setting a shutter speed on said at least one secondary camera, setting an f-stop on said at least one secondary camera and optically adjusting said at least one secondary camera to substantially optically match said first camera.

11. The method of claim 9 wherein said step (c) comprises at least one of the following steps: setting a shutter speed on said at least one secondary camera, setting an f-stop on said at least one secondary camera, and optically adjusting said at least one secondary camera to substantially optically match said first camera.

12. The method of claim 9 wherein each of said first camera and said at least one secondary camera has an objective lens; and in said steps (b) and (d) said first location is substantially adjacent the objective lens of said first camera and where said second location is substantially adjacent the objective lens of said at least one secondary camera.

13. The method of claim 9 wherein in steps (b) and (d) said first location is substantially adjacent said first photographic film and said second location is substanially adjacent said second photographic film.

* * * * *